March 11, 1958 H. Q. MUNN 2,826,053
FLOATING TOOL HOLDER
Filed July 11, 1955 2 Sheets-Sheet 1
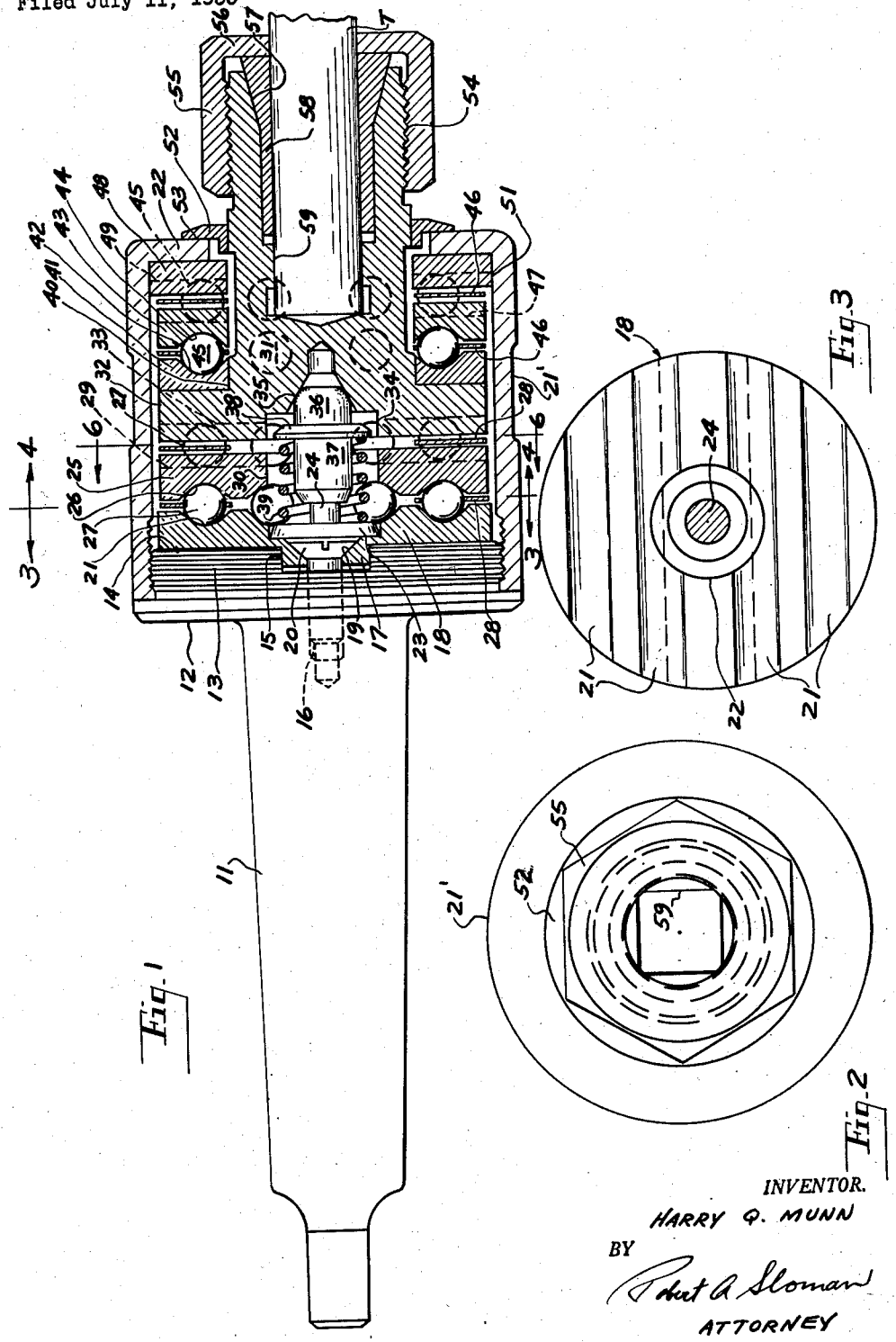
INVENTOR.
HARRY Q. MUNN
BY
Robert A. Sloman
ATTORNEY March 11, 1958 H. Q. MUNN 2,826,053
FLOATING TOOL HOLDER
Filed July 11, 1955 2 Sheets-Sheet 2
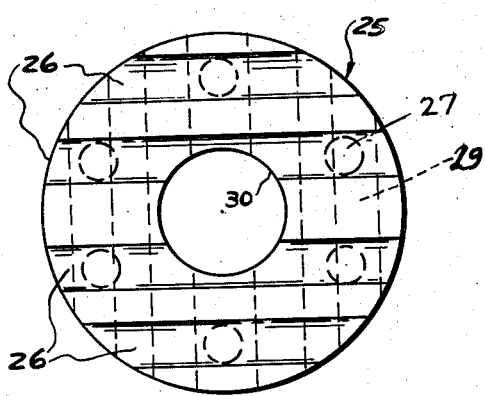
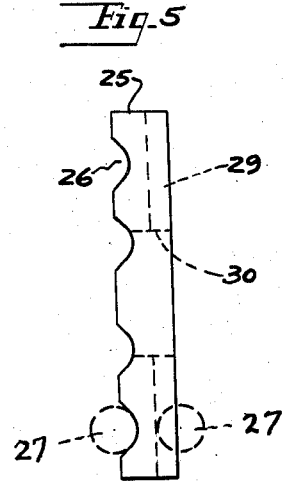
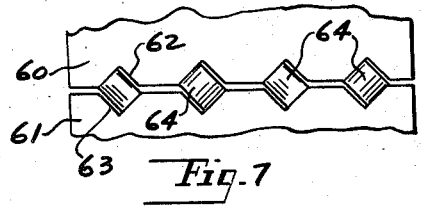
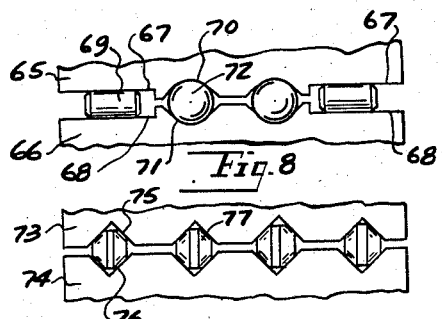
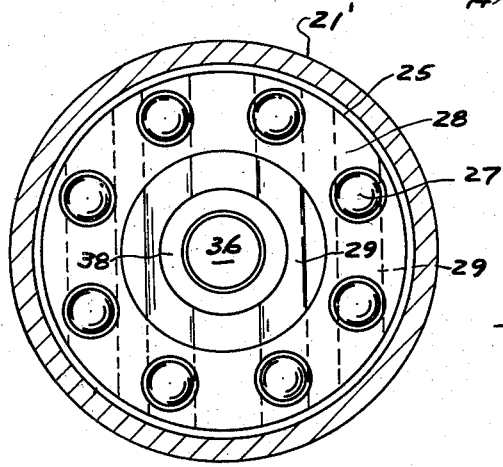
INVENTOR.
HARRY Q. MUNN
BY
Robert A. Sloman
ATTORNEY

United States Patent Office 2,826,053
Patented Mar. 11, 1958

2,826,053

FLOATING TOOL HOLDER

Harry Q. Munn, Birmingham, Mich.

Application July 11, 1955, Serial No. 521,303

3 Claims. (Cl. 64—31)

This invention relates to an improved floating tool holder or coupling and more particularly to a novel form of floating tool holder construction wherein the axis of the driving member and the axis of the driven member are maintained parallel to one another at all times while these members are free to move relatively to one another in any direction within limits in a plane normal to their axes and with negligible friction; the driving member being understood to mean the member adapted to a machine and the driven member to mean the member adapted to the tool.

In prior attempts to achieve these characteristics ball thrust races consisting of flat races separated by balls have been used for applying axial pressure to the moving parts and maintaining parallelism; and pins supporting rollers engaging slots have been used to transmit the torque required in operation.

In the case of flat races the surfaces become slightly indented by the balls due their points of contact causing wear and impairing their functioning; while in the case of driving pins with rollers there is considerable friction between the roller and its supporting pin as well as between the roller and its mating slot.

In the present invention it is the primary object to overcome these difficulties by employing a novel structure wherein a series of balls or rollers or balls and rollers combined may be employed for actually spacing apart the essential elements of the tool holder so that there is no friction-producing contact therebetween.

It is the further object of the present invention to provide elongated grooves in opposed parts of the floating tool holder with a series of balls or rollers movably mounted in said grooves in such a manner that there is provided multiple lines of contact between the balls or rollers and their corresponding grooves.

It is the further object of the present invention to incorporate in the floating tool holder construction a housing retainer, together with suitable bearing means between the retainer and the driven member, to thereby impart an initial axial preload to all moving parts to thereby assure that throughout the life of the tool holder the respective axes of the driving member and the driven member will be in parallelism at all times.

Since the balls or rollers in either case engage grooves in the opposed essential parts, they not only resist any force tending to deflect the axes of the driving and driven members in relation to one another, but they resist torsional load between driving and driven members, thus eliminating the use of driving pins. These conditions constitute further objects of the present invention.

It is, therefore, the further object of the present invention to provide a floating tool holder wherein the axis of the driving member and the axis of the driven member, if misaligned with respect to one another, will be retained at all times in parallel relation to one another while rotating with respect to a workpiece.

It is the further object of the present invention to provide a novel construction wherein the driven member may be movable in any direction within the limits of the device in a plane normal to its axis of rotation.

It is the still further object of the present invention to provide a floating tool holder wherein the action of the movable parts will be as free from friction as possible while being subjected to an axial preload, a bending moment or a torsional load or any combination of these when in operation.

These and other objects will be seen from the following specification and claims in conjunction with the appended drawings in which:

Fig. 1 is a longitudinal section of the present floating tool holder, with a portion of a tool fragmentarily shown.

Fig. 2 is a right end elevational view thereof.

Fig. 3 is a section taken on line 3—3 of Fig. 1.

Fig. 4 is a section taken on line 4—4 of Fig. 1.

Fig. 5 is a side elevational view of the float or intermediate driving race.

Fig. 6 is a section taken on line 6—6 of Fig. 1.

Fig. 7 is a fragmentary and partially diagrammatic view illustrating the use of roller bearings between the respective parts.

Fig. 8 is a similar view illustrating the combination of roller bearings and ball bearings between respective parts; and Fig. 9 is a similar view illustrating a special form of roller bearings between respective parts.

It will be understood that the above drawings illustrate merely the preferred embodiment of the invention and that other embodiments are contemplated within the scope of the claims hereafter set forth.

Referring to Fig. 1, there is provided an elongated driving shank 11 which may be of any desired form suitable for adapting to a machine which will apply a torque thereto, and which is rotatable upon its longitudinal axis.

Said shank has at one end an enlarged circular shoulder 12 which terminates in the threaded end portion 13 and which has formed thereon the right angularly related end face 14.

The keyway or slot 15 is arranged centrally within end face 14 and axially of said keyway there is provided a threaded bore 16. The disc shaped driving race 18, of less diameter than threaded element 13, is positioned against end face 14, and has an elongated key 17 of rectangular cross-section which is nested within keyway 15 and is secured therein by the screw 20. The driving race at its center has a tapered wall portion 19 which cooperatively receives the tapered under surface of screw 20 whereby the driving race 18 is effectively centered and immovably secured with respect to the threaded head 13 and end face 14.

Upon the outer face of driving race 18 there are formed therein a series of parallel spaced grooves 21 of arcuate cross-section and which extend in rows as indicated in Fig. 3, and are adapted to cooperatively receive ball bearings 27 in the manner hereafter described. The elongated retainer housing 21' at its open end is threaded over the threaded end 13 on shank 11 and provides an enclosing retainer for the other parts of the floating tool holder hereafter described, and also keeps dirt from entering the mechanism. The opposite end of the retainer housing includes a centrally apertured annular flange 22 which through certain bearing elements hereafter described, retainingly engages the driven member forming a part of the coupling.

Pin 24 is arranged axially of the driving race 18 and at one end has an annular tapered flange 23 which loosely nests within the shallow axial counterbore in the grooved surface of driving race 18. Pin 24 is adapted for slidable positioning within the bore of the centering spindle 37, whose opposite end is substantially hemispherical as at 36 for axial engagement within the tapered recess 35 formed in the inner end face of the flange 32 on the tool holding driven member 31 for providing an initial centering thereof in the manner hereafter described. The tapered recess 35 in flange 32 terminates at its outer end in the enlarged counterbore 34 which loosely receives shoulder 38 of the centering device.

Coiled spring 39 surrounds centering spindle 36 and is interposed in compression, between flange 23 and the annular shoulder 38 on said spindle. Accordingly, upon completion of the assembly of the tool holder and tightening of the housing 21' there is provided an initial axial preloading of the movable parts of the tool holder whereby the driven member is initially positioned in longitudinal alignment with the longitudinal axis of the driving shank 11 and the driving race 18. The centralizing assembly is effective for this purpose because flange 23 is loosely retained in driving race 18 against radial displacement. Pin 24 guidably and slidably engages spindle 37 which is biased axially outward under the action of compressed spring 39.

While the centralizing device is convenient in conjunction with the present construction, being loosely positioned through the central aperture 30 of the float 25, nevertheless, this centralizing device is not absolutely essential and could be omitted.

Flange 32 of driven member 31 is arranged at right angles to the longitudinal axis of the driven member and in the end face of said flange there are formed a series of parallel spaced grooves 33 of arcuate from in cross-section. These grooves in the initial assembly of the device extend in the direction at right angles to the series of ball receiving grooves 21 formed in driving race 18, and are adapted to cooperately receive the bearings 27 in conjunction with the float mechanism 25 now described.

Interposed between driving race 18 and flange 32 of driven member 31 there is provided an intermediate driving race or float 25 which is of less external diameter than the internal diameter of retainer housing 21'. In one end face of float 25 there are formed a series of parallel spaced elongated grooves of arcuate shape in cross-section which are arranged in opposed relation to the corresponding grooves 21 formed in race 18. The grooves 26 and 21 cooperatively receive therebetween a series of bearings, which in this embodiment are ball bearings 27 which are loosely mounted within the ball retainers 28, of which there are four in the present embodiment.

The only function of the retainer is to retain the balls in suitable relative positions, each retainer having a series of circular transverse apertures which loosely receive the said ball bearings 27 and maintain them in a circular arrangement, such as illustrated in Fig. 6. These retainers lie loosely in their alloted space and cause no friction, and themselves have no contact with the driving race 18 or intermediate driving race 25.

There are also formed within the opposite face of float 25 another series of parallel spaced grooves 29 which are of similar arcuate cross-section and which cooperate with and are in opposed relation to the series of spaced grooves 33 in the end face of flange 32 for receiving the second series of bearings 27 within their retainers 28.

Accordingly, the series of grooves 29 extend in a direction at right angles to the series of grooves 26 on the opposite side of float 25.

In other words, the driving relation between driving race 18 and the flange 32 of the driven member is strictly through the balls 27 arranged upon opposite sides of float 25 and movably mounted respectively within the above described grooves. Accordingly, as viewed in Fig. 1, the float 25 is restricted to movements with respect to race 18 in the direction of the slots 21 and 26, i. e., normally of the plane of the illustration of Fig. 1.

This means that the driven member 31 which is joined by the float 25 to race 18 through the said balls is thereby controlled for transverse adjustments in this same direction, i. e., normally in the plane of the illustration.

Additionally, in view of the right angularly related grooves 29 and 33 and the second set of bearings 27 between flange 32 and float 25, the said driven member is also adapted for transverse adjustments in the plane of the illustration of Fig. 1 with respect to the said float.

Accordingly, in view of the above described assembly, the driven member may move simultaneously in either the plane of the illustration or at right angles thereto and, consequently, in any direction which is a resultant of these two movements. In other words, the driven member may float in any direction in a plane normal to the longitudinal axis of the coupling.

In view of the axial preload which is introduced between the moving parts of the coupling and in view of the grooves provided, as well as the bearings interposed between the moving parts and stationary parts, all such transverse movements of the driven member 31 with respect to the driving race 18 will be such that the longitudinal axis of the driven member, as well as the tool T will be in planes parallel to the longitudinal axis of the shank 18. In other words, the present construction will maintain a parallelism between the respective axes of the shank 11 and the driven member 31.

Thrust bearing means are also employed in conjunction with the side of flange 32 opposite from its grooved end face, which bearing means cooperate with flange 22 of retainer housing 21' for completing the assembly of the coupling and for imparting to the movable parts thereof an initial axial preload.

For this purpose, and in the preferred embodiment of the invention, there are provided a series of thrust bearing elements 41, 43 and 48, which are of a construction quite similar to the ball and groove arrangement above described in conjunction with members 18, 25 and 32.

Mounted upon the shoulder 40 of driven member 31 there is provided thrust race 41 of less diameter than the internal diameter of retainer 21', and in the outer end face thereof there are formed a series of parallel spaced grooves 42 for receiving the bearings 45, which in the preferred embodiment are ball bearings. Intermediate thrust race 43 is loosely positioned around driven member 31 and in one face thereof has formed therein a series of parallel spaced grooves 44 of arcuate cross-section which are arranged in opposed relation to grooves 42 and cooperate therewith for retaining the series of circularly arranged ball bearings 45, and their bearing retainer 46 which is loosely interposed between races 41 and 43.

The opposite end face of floating thrust race 43 has a second series of parallel spaced grooves 47 adapted to cooperatively receive the set of bearings 45 within their retainer 46.

There is also snugly provisioned within the end portion of retainer 21' a third thrust race 48 as indicated at 51; and in the inner end face of this member there are provided a series of parallel spaced grooves 49 of arcuate cross-section which are arranged in opposed relation to the transverse grooves 47 formed in intermediate thrust race 43, and which cooperate therewith for supporting therebetween the ball bearings 45.

Here also the grooves 47 and 49 extend in a direction at right angles to the direction of the grooves 42 and 44 so that the functioning of the set of thrust races is exactly the same as the functioning of the members 18, 25 and 32, to thereby establish a free floating relationship between the respective parts between thrust races and the driven member 31.

Upon proper tightening of the retainer 21' with respect to the threads 13 and functioning through the above described thrust races there is thus initially attained an axial preloading of the moving parts of the present coupling.

This axial preload through each of the sets of bearings and in cooperation with the respective opposed grooves initially retains the respective parts of the coupling in axial parallelism. Should there be any misalignment between the longitudinal axes of the driven member 31 and the driving shank 11, then in that case the said arrangement of parts guarantees that the respective axes of the driven member and the shank will at all times be parallel, to thereby attain the objects above set forth.

Annular disc 52 is immovably secured upon the exterior of driven member 31 and is spaced outwardly slightly from the centrally apertured flange 22 of the retainer housing 21' as indicated at 53 to provide a further closure for the casing and to exclude dirt or foreign matter from the interior thereof.

The outer end of driven member 31 is exteriorly threaded as at 54 and is adapted to threadedly receive the cap 55 which at one end has a centrally apertured annular bottom flange 56 which retainingly engages the adaptor 58 for the tool T which may be a tap or a reamer or other tool.

The inner surface of the end portion 54 of the driven member 31 is tapered as at 57 for cooperatively retaining engagement with a correspondingly shaped end portion of adaptor 58 whereby the tool is effectively gripped within the bore 59 at the outer end of driven member 31.

While in the preferred embodiment ball bearings have been described, Figs. 7, 8 and 9 show the use of other types of bearings which will function just as well in the present construction; it being the primary object that the bearings between the respective parts provide line contacts between the relatively movable elements of the coupling.

For example, in Fig. 7 the two relatively movable elements 60 and 61 have formed therein opposed elongated parallel grooves 62 and 63 for cooperatively receiving the series of rollers 64 which will function just as well as the ball bearings 27.

In Fig. 8, the pair of opposed elements 65 and 66 have formed therein opposed parallel transverse grooves 67 and 68 which cooperatively receive therebetween the rollers 69. Additionally, in the opposing surfaces of elements 65 and 66 there are formed parallel elongated opposed rows of grooves 70 and 71 which cooperatively receive ball bearings 72. Accordingly, there may be a combination of ball bearings and roller bearings to thereby provide lines of contact between the relatively movable parts of the holder.

Figure 9 illustrates still another slight variation wherein, for illustration, a pair of relatively movable parts 73 and 74 have formed in their opposed end faces a series of parallel spaced grooves 75 and 76 which cooperatively receive therebetween a series of special formed bearings 77, which also provide and assure between their respective elements parallel lines of contact therebetween for thereby minimizing friction.

As above described, by interposing bearings 27 between driving race 18 and intermediate race 25; and by interposing an additional set of bearings 27 between intermediate race 25 and the driven member 31, a driving relation is established between the said parts whereby rotative power transmitted through race 18 will effect rotary movement of the driven member 31 with a minimum of friction.

Furthermore, since all the moving parts and the interposed balls are held together under a strain or preload by the retainer 21', driving member 11 and driven member 31 are maintained axially parallel to one another and resist any bending moment about their axes.

In the above floating coupling, no fixed or moving part is in slidable contact with any other part. Instead, there is a pure rolling action through the medium of the bearings which roll freely on imaginary axes. Consequently, the relative movement of the parts is as nearly frictionless as possible, and friction in the present construction does not increase appreciably with the load.

Another important feature of the present invention is that the balls contact the respective mating surfaces of the adjacent parts along lines of contact instead of at points and, consequently, the present device will withstand much greater loads over a long period of time, thus extending the life of the device.

Brinelling of surfaces is overcome and prevented by supportably positioning the balls within grooved faces, with the balls fitting the grooves at lines of contact.

Having described my invention, reference should now be had to the claims which follow for determining the scope thereof.

I claim:

1. A floating tool holder comprising a driving shank rotatable on its longitudinal axis and having an end face at right angles to said axis, a disc shaped driving race axially secured upon said end face and having formed in its outer face a series of parallel spaced grooves of arcuate cross section, an elongated driven member co-axial with said shank having an axial bore at one end to receive a tool and at its other end an end face at right angles to said axis spaced from said driving race, and having formed therein a series of parallel spaced grooves of arcuate cross section extending at right angles to said first grooves, an intermediate disc shaped driving race spaced from and between said driving race and driven member, one face of said intermediate race having a series of parallel spaced grooves of arcuate cross section arranged in opposed relation to the grooves of said driving race, its other face having a series of parallel spaced grooves of arcuate cross section extending at right angles to the grooves in said one face and arranged in opposed relation to the grooves on the end face of the driven member, retainer discs intermediate opposite sides of the intermediate race and the drive race and driven member, respectively, bearings in said retainers movably mounted in the respective opposing grooves defining lines of contact between opposing members, a retainer housing loosely enclosing said races and driven member at one end threaded to said shank, said driven member having a flat radial shoulder, said retainer housing having a flat radial inner face, a thrust race axially mounted on said driven member having one flat end face at right angles to said axis engaging said shoulder with a series of parallel spaced grooves of arcuate cross section formed in its opposite end face, a second co-axial thrust race mounted on said retainer housing and having one flat end face at right angles to said axis engaging the inner face of said retainer with a series of parallel spaced grooves of arcuate cross section formed in its opposite end face extending in a direction at right angles to the grooves in said thrust race, an intermediate thrust race spaced between said thrust races with its opposite sides having formed therein a series of parallel spaced grooves of arcuate cross section with the grooves on one side in opposed relation to the grooves in the first thrust race and with the grooves on its other side in opposed relation to the grooves in said second thrust race, and bearings with retainers movably mounted in the respective opposing grooves of said thrust races defining lines of contact there between, said retainer housing applying an axial preload to said thrust races and other moving parts.

2. A floating tool holder or coupling comprising a driving member rotatable on its axis and having a series of parallel spaced grooves of arcuate cross section in its end face, a driven member co-axial with the said driving member, an annular flange on one end of the driven member, the outer and inner faces of the flange each having therein a series of parallel spaced grooves of arcuate cross section, the other end of the driven member being extended and having an axial bore to receive a tool, an intermediate annular driving member having a series of parallel spaced grooves on one face and a similar series of grooves on the other face but arranged at right angles to the grooves on said first face, this intermediate driving member being between and spaced from the grooved face of the driving member and the grooved outer face of the driven member flange, an annular end thrust race having parallel grooves of arcuate cross section on one side and a plane surface on the other side, an intermediate annular thrust race, having parallel grooves of arcuate cross section on one face and similar grooves on the other face but arranged at right angles to the grooves on its first face, this intermediate race being between and spaced from the inner face of the driven member flange and the inner face of said end thrust race, four sets of balls, one set each being between and engaging appropriate adjacent grooves in the driving and intermediate driving members, the intermediate and driven members, the driven and intermediate thrust members, the intermediate thrust and end thrust members, respectively, and a retainer housing threaded to said driving member loosely enclosing and applying an axial preload to the moving parts, said floating tool holder or coupling comprising specifically four distinct sets of balls arranged in parallel planes at right angles to the axes of the driving and driven members, each set operating in parallel spaced grooves of arcuate cross section formed on the transverse faces of the essential parts in such manner as to allow movement in any direction at right angles to the axes.

3. The tool holder of claim 1, and a centralizing device intermediate said driving race and driven member consisting of an axial thimble having an axial bore at one end, its opposite end being hemispherical and centrally engaging in retaining relation said driven member, said thimble having an annular shoulder, an elongated pin slidably extending into said bore and at one end having an annular flange centrally nested loosely within the driving race, and a coiled spring under compression interposed between said flange and shoulder.

References Cited in the file of this patent

UNITED STATES PATENTS

| 1,907,447 | Schiltz | May 9, 1933 |
| 2,371,330 | Irstad | Mar. 13, 1945 |

FOREIGN PATENTS

| 381,319 | Great Britain | Oct. 6, 1932 |
| 613,788 | Great Britain | Dec. 2, 1948 |